US010357897B2

(12) United States Patent
Yamada et al.

(10) Patent No.: US 10,357,897 B2
(45) Date of Patent: Jul. 23, 2019

(54) CONCRETE-REINFORCING SHAPED BODY, METHOD OF MANUFACTURING THE SAME, STRUCTURE OF PACKAGING CONCRETE-REINFORCING SHAPED BODY, AND METHOD OF MIXING FIBER-REINFORCED CONCRETE

(71) Applicant: Sumitomo (SEI) Steel Wire Corp., Itami-shi (JP)

(72) Inventors: Masato Yamada, Itami (JP); Yoshiyuki Matsubara, Itami (JP); Kiminori Matsushita, Itami (JP); Shuichi Tanaka, Itami (JP); Masashi Oikawa, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/554,919

(22) PCT Filed: Feb. 5, 2016

(86) PCT No.: PCT/JP2016/053547
§ 371 (c)(1),
(2) Date: Aug. 31, 2017

(87) PCT Pub. No.: WO2016/158008
PCT Pub. Date: Oct. 6, 2016

(65) Prior Publication Data
US 2018/0036910 A1 Feb. 8, 2018

(30) Foreign Application Priority Data
Apr. 1, 2015 (JP) .................... 2015-074795

(51) Int. Cl.
*B28C 5/40* (2006.01)
*C04B 14/48* (2006.01)
(Continued)

(52) U.S. Cl.
CPC .............. *B28C 5/402* (2013.01); *B28B 1/523* (2013.01); *B28C 7/06* (2013.01); *C04B 14/48* (2013.01);
(Continued)

(58) Field of Classification Search
CPC ....... B28B 1/523; B28B 1/52; B28B 23/0081; C04B 14/48; C04B 20/00; C04B 28/02;
(Continued)

(56) References Cited

U.S. PATENT DOCUMENTS 4,224,377 A * 9/1980 Moens .................... C04B 14/48
428/369
5,453,310 A * 9/1995 Andersen .............. B01F 3/1214
106/672
(Continued)

FOREIGN PATENT DOCUMENTS

EP 0 557 617 A1 9/1993
FR 2916440 A1 11/2008
(Continued)

*Primary Examiner* — Camie S Thompson
(74) *Attorney, Agent, or Firm* — Baker Botts LLP; Michael A. Sartori

(57) ABSTRACT

To provide a concrete-reinforcing shaped body containing concrete-reinforcing fibers and having a plate-like shape. The concrete-reinforcing fibers each preferably have a diameter of 0.3 mm or smaller and a length of 5 mm or larger and 25 mm or smaller.

7 Claims, 3 Drawing Sheets

(51) Int. Cl.
   *B28B 1/52* (2006.01)
   *E04C 5/07* (2006.01)
   *B28C 7/06* (2006.01)
   *C04B 20/00* (2006.01)
   *E04C 5/01* (2006.01)

(52) U.S. Cl.
   CPC .............. *C04B 20/00* (2013.01); *E04C 5/012* (2013.01); *E04C 5/073* (2013.01); *E04C 5/076* (2013.01)

(58) Field of Classification Search
   CPC ..... C04B 28/00; C04B 28/0048; C04B 16/06; C04B 22/04; E04C 5/073; E04C 5/012; E04C 5/03; E04C 45/07; F28F 3/025; Y10T 39/49801; Y10T 29/49801; Y10T 428/249932; Y10T 428/1372; Y10T 428/2904; B21F 45/006; B21B 1/163; B21B 1/63; B21H 8/00; B28C 5/073; B32B 13/02; B32B 2262/103; B23P 17/06
   USPC ......... 428/292.1, 294.7, 703, 113, 218, 34.4, 428/107, 359, 544, 573, 574; 29/419; 89/913; 419/4; 442/59; 206/449; 427/435
   See application file for complete search history.

(56) References Cited

U.S. PATENT DOCUMENTS

| | | | |
|---|---|---|---|
| 6,063,332 A | * | 5/2000 | Imamura ................. B21F 45/00 29/4.51 |
| 6,797,370 B1 | | 9/2004 | Bechtoldt et al. |
| 2007/0190300 A1 | * | 8/2007 | Bell ........................ C04B 18/02 428/294.7 |
| 2010/0229714 A1 | * | 9/2010 | Tonyan .................. B28B 1/522 89/36.02 |

FOREIGN PATENT DOCUMENTS

| | | | |
|---|---|---|---|
| JP | 2001-192249 A | | 7/2001 |
| JP | 2002-356353 A | | 12/2002 |
| JP | 2006-152747 | * | 6/2006 |
| JP | 4541259 B2 | | 7/2010 |
| JP | 2011-256080 A | | 12/2011 |
| WO | 00/49211 A1 | | 8/2000 |

* cited by examiner

CONCRETE-REINFORCING SHAPED BODY, METHOD OF MANUFACTURING THE SAME, STRUCTURE OF PACKAGING CONCRETE-REINFORCING SHAPED BODY, AND METHOD OF MIXING FIBER-REINFORCED CONCRETE

TECHNICAL FIELD

The present invention relates to a concrete-reinforcing shaped body, a method of manufacturing the same, a structure of packaging a concrete-reinforcing shaped body, and a method of mixing fiber-reinforced concrete.

BACKGROUND ART

To meet recent-year trends such as higher buildings and larger-scale buildings, there has been an increasing demand for concrete (a cementitious material) that exhibits a high level of compressive strength and bending strength. One of means for imparting such characteristics is a technique of adding any of metal fibers, resin fibers, inorganic fibers, and the like (hereinafter generally referred to as "concrete-reinforcing fibers") to concrete (see PTL 1).

Concrete-reinforcing fibers each have a diameter of several tenths of millimeters and a length of several tens of millimeters (see PTL 2 and 3). Concrete-reinforcing fibers are stored in a drum or the like. To feed such concrete-reinforcing fibers into a concrete-mixing machine, the concrete-reinforcing fibers are taken out of the drum and are sieved before being fed into the mixing machine.

In such a process, for example, even if piles of concrete-reinforcing fibers are fed in units of about 2 kg, about 30% of the concrete-reinforcing fibers tangle together into blocks of concrete-reinforcing fibers, which are called fiber balls. Fiber balls thus generated may trigger deterioration in the quality of concrete. In the worst scenario, a whole batch of concrete may need to be disposed of, the number of times of cleaning of the mixing machine after such disposal may increase, or the mixing machine may be damaged.

Hence, in the known art, concrete-reinforcing fibers are fed from the drum into the mixing machine through a sieve.

CITATION LIST

Patent Literature

PTL 1: Japanese Patent No. 4541259
PTL 2: Japanese Unexamined Patent Application Publication No. 2001-192249
PTL 3: Japanese Unexamined Patent Application Publication No. 2002-356353

SUMMARY OF INVENTION

Technical Problem

Concrete-reinforcing fibers are mixed at construction sites. Therefore, the number of steps included in the mixing operation is preferably as small as possible. Hence, the step of sieving concrete-reinforcing fibers is preferably omissible.

In view of the above, an object of the present invention is to make the step of sieving concrete-reinforcing fibers at the work site omissible.

Solution to Problem

To achieve the above object, the present invention provides a concrete-reinforcing shaped body containing concrete-reinforcing fibers and having a plate-like shape.

Advantageous Effects of Invention

According to the present invention, concrete-reinforcing fibers are shaped like a plate. Hence, the probability that the concrete-reinforcing fibers may tangle together is extremely low. Consequently, even if the concrete-reinforcing fibers are not sieved when being fed into a mixing machine, no fiber balls are generated in the mixing operation.

Figure 1:
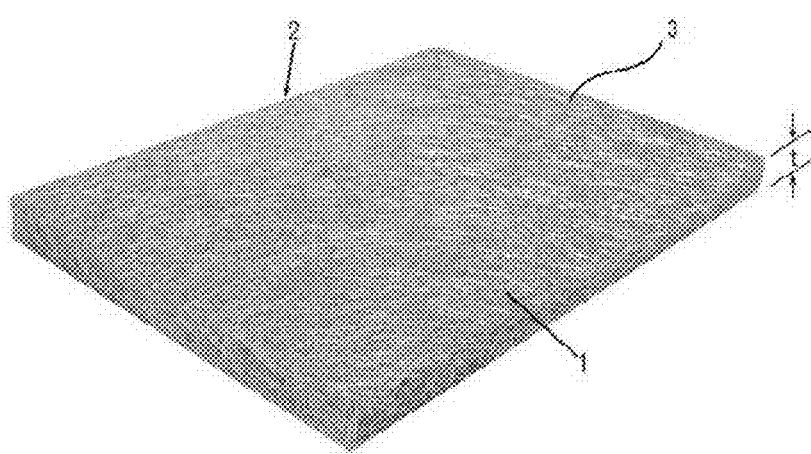
FIG. 1 is a perspective view of a concrete-reinforcing shaped body according to an embodiment of the present invention.

DESCRIPTION OF EMBODIMENTS (Description of Embodiments of Invention)
A concrete-reinforcing shaped body according to an embodiment of the present invention employs a configuration as a pile of concrete-reinforcing fibers shaped like a plate.

In such a plate-like concrete-reinforcing shaped body containing concrete-reinforcing fibers, the probability that the concrete-reinforcing fibers may tangle together is extremely low. Therefore, the probability that fiber balls may be generated is also extremely low even if the fibers are not sieved when being fed into the mixing machine. Hence, the concrete-reinforcing fibers can be fed directly into the mixing machine. Consequently, a cost reduction with, for example, the omission of the sieving step performed in the known art can be achieved.

The concrete-reinforcing fibers may have any cross-sectional shape, any diameter if having a round cross section, and any length as long as the fibers are effective in reinforcing concrete (inclusive of mortar). For example, the concrete-reinforcing fibers each have a diameter of 0.3 mm or smaller and a length of 5 mm or larger and 25 mm or smaller.

The shape, the size, or other like factors of the concrete-reinforcing shaped body may be set according to need by finding out the extent at which no fiber balls are generated after the shaped body is fed into the mixing machine from experiments, actual operation, and so forth. In plan view, the concrete-reinforcing shaped body has, for example, a round shape, a rectangular shape with a length of 270 mm or larger and 350 mm or smaller and a width of 310 mm or larger and 400 mm or smaller, or any other polygonal shape of a size approximately the same as the foregoing. The concrete-reinforcing shaped body may be wound into a roll. Such a roll of concrete-reinforcing shaped body may be packed in a tube or may be wrapped with a sheet and tied with a cord, so that the roll shape can be retained.

If the concrete-reinforcing shaped body is too thick, the reinforcing fibers aligned in the X-Y direction may be disturbed. Moreover, the size of the feeding slot of the mixing machine is limited. Furthermore, if the concrete has low viscosity (if the concrete is soft), the effect of taking the concrete-reinforcing fibers apart (the shearing force or the like) is small. Therefore, fiber balls may be generated. Considering such circumstances, the concrete-reinforcing shaped body preferably has a thickness of 3 mm or larger and 45 mm or smaller.

The concrete-reinforcing fibers are preferably made of steel.

If the concrete-reinforcing fibers are made of steel, the compressive strength and the bending strength of the concrete to which the fibers have been added can be increased further.

The concrete-reinforcing shaped body preferably has a density of 300 g/cm$^3$ or higher and 1000 g/cm$^3$ or lower.

If the concrete-reinforcing shaped body has a density below 300 g/cm$^3$, the concrete-reinforcing shaped body may be torn apart when fed into the mixing machine, lowering the workability. If the concrete-reinforcing shaped body has a density over 1000 g/cm$^3$, the fibers are difficult to disperse into the concrete.

The concrete-reinforcing shaped body has a first end face continuous with a first major face and with a second major face that is opposite the first major face, and a second end face continuous with the first major face and with the second major face and opposite the first end face. The second end face is preferably thinner than the first end face.

In the above configuration, the frictional resistance between the concrete-reinforcing shaped body and a packaging material is small, and the concrete-reinforcing shaped body can be easily fed into the mixing machine.

The thickness of the second end face of the concrete-reinforcing shaped body is preferably 5% to 50%, inclusive, of the thickness of the first end face.

If the thickness of the second end face is 50% of the thickness of the first end face or smaller, the effect of reducing the frictional resistance between the concrete-reinforcing shaped body and the packaging material is great. Therefore, the concrete-reinforcing shaped body can be easily fed into the mixing machine. In contrast, if the thickness of the second end face is smaller than 5% of the thickness of the first end, the concrete-reinforcing shaped body may be torn apart when fed into the mixing machine, lowering the workability.

The concrete-reinforcing shaped body preferably has a rectangular shape in plan-view.

The concrete-reinforcing shaped body having a rectangular shape in plan-view is easy to maintain and handle.

There are various possible methods of manufacturing the concrete-reinforcing shaped body. For example, the concrete-reinforcing shaped body may be manufactured by dropping concrete-reinforcing fibers into a flat box through a sieve.

In such a method, the concrete-reinforcing shaped body can be provided in a packaged form with the flat box.

The concrete-reinforcing shaped body only needs to be fed into a concrete-mixing machine as in the known art. Note that a plurality of concrete-reinforcing shaped bodies may be fed into the mixing machine at a time.

The plate-like concrete-reinforcing shaped body may be manufactured with a constant thickness (layer thickness) and in the form of a long strip continuously extending in one direction (the long-side direction or the short-side direction of the rectangular shape in the plan view illustrated in FIG. 1) and be cut at arbitrary positions in that continuous direction (the lengthwise direction of the strip). The cut pieces of concrete-reinforcing shaped body in the form of long strips may each be wound into a roll (rolled into a cylindrical shape). In such a case, the roll of concrete-reinforcing shaped body can be continuously fed into the mixing machine while being unwound from the roll. The concrete-reinforcing shaped body may be wound by one turn or by a plurality of turns, i.e., two, three, four, or more turns. The roll of concrete-reinforcing shaped body may be packed in a tube or may be wrapped with a sheet and tied with a cord, so that the roll shape can be retained.

(Details of Embodiments of Invention)

<First Embodiment>

Specific embodiments of the concrete-reinforcing shaped body according to the present invention will now be described. First, a steel cord obtained by intertwining a plurality of steel strings each having a round cross section with a diameter of 0.2 mm was cut into pieces each having a length of 15 mm or 22 mm. Thus, concrete-reinforcing fibers 1 according to an embodiment of the present invention were manufactured and were stored in containers such as drums.

Figure 3:
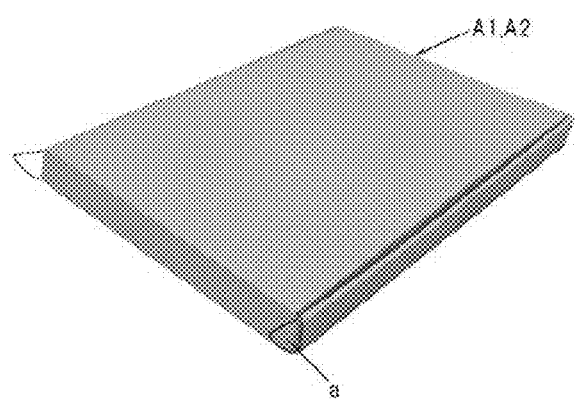
FIG. 3 is a perspective view of a box in which the concrete-reinforcing shaped body is packed.
Figure 4:
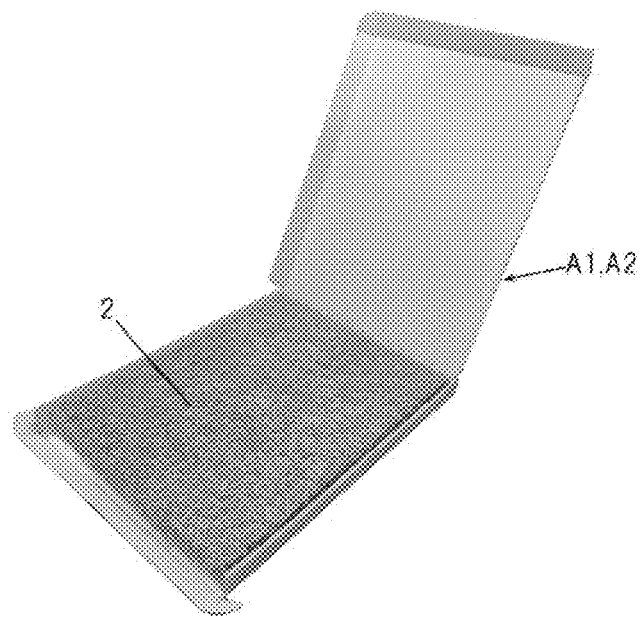
FIG. 4 is a perspective view of the box in which the concrete-reinforcing shaped body is packed, with the lid thereof being open.
Figure 5:
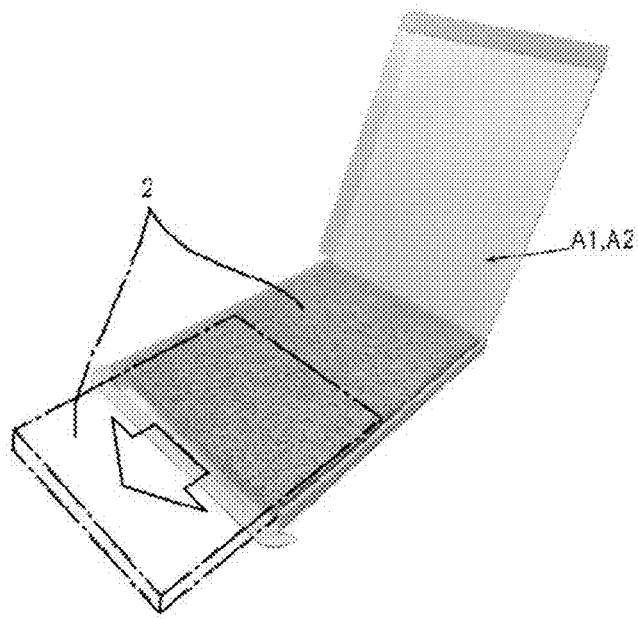
FIG. 5 is a perspective view for illustrating how to take out the concrete-reinforcing shaped body according to the embodiment from the box.
Figure 6:
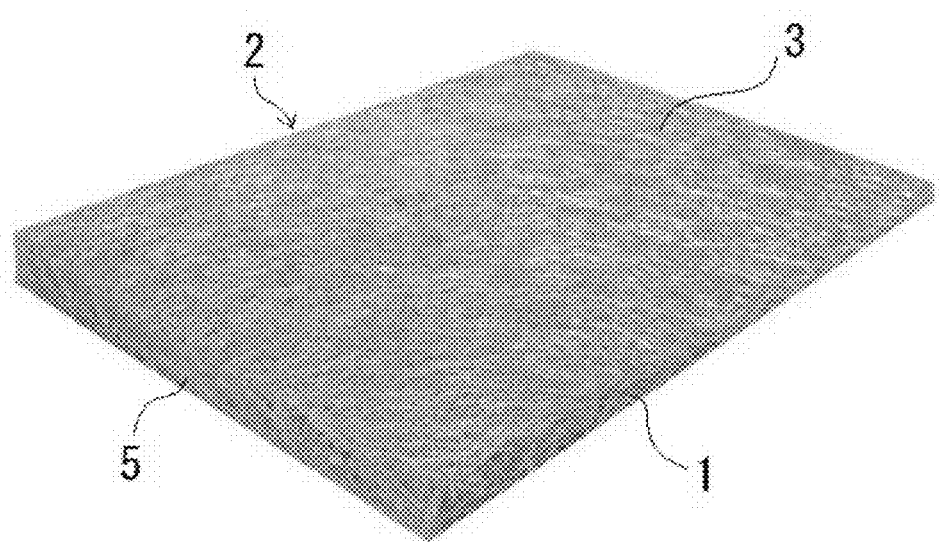
FIG. 6 is a perspective view of a concrete-reinforcing shaped body according to another embodiment.

Meanwhile, cardboard boxes illustrated in FIGS. 3 to 5 were prepared as flat boxes A1 and flat boxes A2, which are packaging materials. The flat boxes A1 each had an inner width of 270 mm, an inner depth of 310 mm, and an inner height of 30 mm. The flat boxes A2 each had an inner width of 310 mm, an inner depth of 310 mm, and an inner height of 45 mm.

Subsequently, from the containers such as drums, the concrete-reinforcing fibers 1 each having a length of 15 mm were dropped into the flat boxes A1, and the concrete-reinforcing fibers 1 each having a length of 22 mm were dropped into the flat boxes A2. The concrete-reinforcing fibers 1 were dropped through a sieve having a mesh 12 (square holes each having a size of 10 mm by 10 mm) while being moved back and forth in the horizontal direction in the sieve and were piled in layers, whereby plate-like concrete-reinforcing shaped bodies 2 illustrated in FIG. 1 were formed. The concrete-reinforcing shaped bodies 2 each had a thickness t of about 15 mm or 30 mm in the flat box A1 and about 30 mm or 45 mm in the flat box A2. The concrete-reinforcing shaped bodies each had a density of 500 g/cm$^3$.

Figure 2:
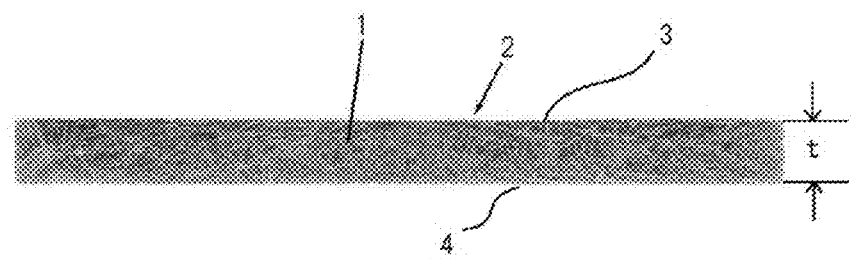
FIG. 2 is a side view of the concrete-reinforcing shaped body according to the embodiment.

How the fibers form layers is illustrated in FIGS. 1 and 2. It is understood that most of the concrete-reinforcing fibers 1 are piled in layers and aligned in the horizontal direction with less tangles.

Table 1 summarizes experimental examples in which the above concrete-reinforcing shaped bodies 2 were used in manufacturing fiber-reinforced concrete named SUQCEM (a registered trademark) disclosed by PTL 1 and so forth. In Table 1, "Excellent" means "smooth", "OK" means "acceptable", and "NG" means "somewhat inferior". Regarding Example 2, "NG" in "Untangleness" was the case of the flat box A2.

TABLE 1

| | No. | Ease of taking out of the box | Untangleness (before feeding) | Dispersiveness |
|---|---|---|---|---|
| Example 1 | A1: 15-mm thick A2: 30-mm thick | OK | OK | OK |
| Example 2 | A1: 30-mm thick A2: 45-mm thick | OK | OK or NG | OK |
| Example 3 | A1: 30-mm thick A2: 30-mm thick | Excellent | OK | OK |

The above examples show that the concrete-reinforcing shaped bodies 2 according to the present invention can be smoothly fed into the mixing machine at a time as illustrated in FIG. 5 and are less likely to generate fiber balls. As illustrated in FIGS. 3 to 5, the flat box A1 and the flat box A2 each have one sidewall a having arc-shaped side tabs. Therefore, the sidewall is easily openable in the feeding step. Hence, the concrete-reinforcing shaped body 2 can be smoothly taken out (fed).

The feeding of Examples 1 to 3 into the mixing machine may be performed by using an automated machine. Even if forty batches were fed at a time, most of the concrete-reinforcing fibers 1 were retained in layers and were aligned in the horizontal direction with less tangles. Some tangles of the concrete-reinforcing fibers 1 shaped like a plate were undone in the mixing step. Hence, no fiber balls were generated in the concrete.

The fiber-reinforced concrete containing the concrete-reinforcing fibers 1 showed satisfactory results in a mortar flow test, in a slump flow test, and in flow stop time.

The concrete-reinforcing shaped bodies 2 according to the above embodiment were packed in flat rectangular cardboard boxes, respectively. The concrete-reinforcing shaped bodies 2 may alternatively be wound into rolls. Such rolls of concrete-reinforcing shaped bodies 2 may each be packed in a tube or may be wrapped with a sheet and tied with a cord, so that the roll shape can be retained. Alternatively, the concrete-reinforcing shaped bodies 2 may each be manufactured with a constant thickness t and in the form of a long rectangular strip continuously extending in the long-side direction or in the short-side direction of the rectangular shape thereof. The long strip to be manufactured (or thus manufactured) may be cut at arbitrary positions in the lengthwise direction thereof. The concrete-reinforcing shaped bodies 2 each being in the form of a long strip may be wound in a roll. In that case, supporting plates serving as frames each being long enough to prevent the deformation of the concrete-reinforcing shaped body may be provided on two respective lengthwise sides of each concrete-reinforcing shaped body 2 that is in the form of a long strip. Furthermore, lengthwise ends may be provided with other supporting plates serving as frames extending in the orthogonal direction. If the ends are formed of such supporting plates, the cutting step is unnecessary. Such a roll-shaped concrete-reinforcing shaped body 2 may also be packed in a tube or may be wrapped with a sheet and tied with a cord, so that the roll shape can be retained.

While the above embodiment concerns an exemplary case where the concrete-reinforcing fibers 1 are metal fibers, various other fibers such as resin fibers or inorganic fibers made of carbon or the like may alternatively be employed, of course. The major cause of the generation of fiber balls is the diameter and the length of the fibers. Therefore, the diameter and the length of the fibers that do not trigger the generation of fiber balls are determined appropriately on the basis of experiments or the like and in accordance with the kind of the reinforcing fibers.

<Second Embodiment>

Figure 7:
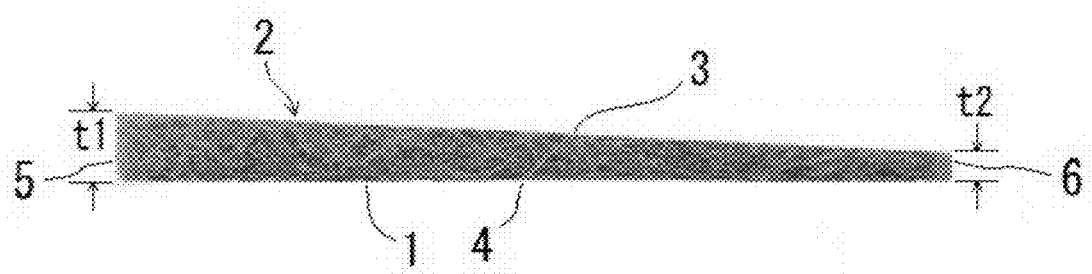
FIG. 7 is a side view of the concrete-reinforcing shaped body according to the other embodiment.
Figure 8:
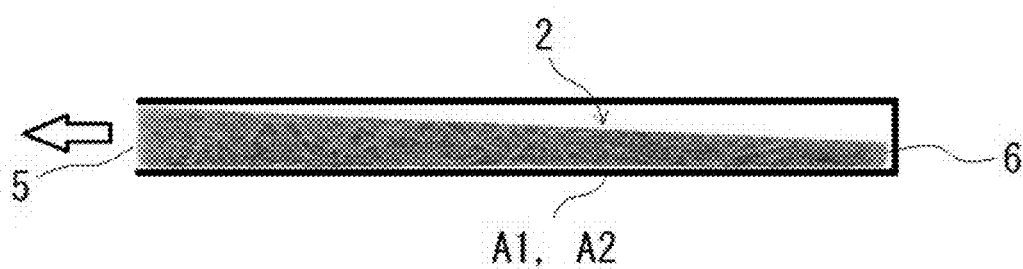
FIG. 8 is a side view for illustrating how to take out the concrete-reinforcing shaped body according to the other embodiment from a box.

The concrete-reinforcing shaped bodies 2 were manufactured in the same manner as in the first embodiment but with different thicknesses. In side view, one end face of each of the concrete-reinforcing shaped bodies 2 was made thinner than the other end face. Specifically, as illustrated in FIG. 7, concrete-reinforcing shaped bodies 2 were prepared with different thicknesses t1 of the first end face and different thicknesses t2 of the second end face. The thicknesses t1 of the first end face and the thicknesses t2 of the second end face are summarized in Table 2 below.

The ease of feeding of the concrete-reinforcing shaped bodies 2 prepared as above into the mixing machine was evaluated as follows: "Excellent" means the speed of feeding was high, "Good" means the speed of feeding was low, and "OK" means the concrete-reinforcing shaped body 2 was torn during the feeding step.

TABLE 2

| Thickness t1 (mm) | Thickness t2 (mm) | Ease of feeding into mixing machine |
|---|---|---|
| 30 | 1 | OK |
| 30 | 1.5 | Excellent |
| 30 | 15 | Excellent |
| 30 | 30 | Good |

The above results show that the thickness t2 of the second end face is preferably 5% to 50%, inclusive, of the thickness t1 of the first end face.

It should be understood that the embodiments disclosed herein are only exemplary in all details and do not limit the present invention. The scope of the present invention is defined by the appended claims and is intended to encompass meanings that are equivalent to the claims and all changes made to the claims within the scope.

REFERENCE SIGNS LIST

A1, A2 flat box
1 concrete-reinforcing fiber
2 concrete-reinforcing shaped body
3 first major face
4 second major face
5 first end face
6 second end face
t thickness of concrete-reinforcing shaped body
t1 thickness of first end
t2 thickness of second end

The invention claimed is:

1. A fiber shaped body for reinforcing concrete comprising concrete-reinforcing fibers and having a planar shape,
wherein the concrete-reinforcing fibers are made of steel,
wherein the concrete-reinforcing fibers each have a diameter of 0.3 mm or smaller and a length of 5 mm or larger and 25 mm or smaller,
wherein the fiber shaped body has a thickness of 3 mm or larger and 45 mm or smaller, and
wherein the fiber shaped body has a first end face continuous with a first major face and with a second major face that is opposite the first major face, and a second end face continuous with the first major face and with the second major face and that is opposite the first end, and wherein the second end face is thinner than the first end face.

2. The fiber shaped body according to claim 1, wherein the fiber shaped body has a density of 300 g/cm$^3$ or higher and 1000 g/cm$^3$ or lower.

3. The fiber shaped body according to claim 1, wherein the second end face has a thickness that is 5% to 50%, inclusive, of a thickness of the first end face.

4. The fiber shaped body according to claim 1, wherein the fiber shaped body has a rectangular shape in plan-view.

5. A method of manufacturing a fiber shaped body, the method comprising forming the fiber shaped body according to claim 1 by dropping the concrete-reinforcing fibers into a flat box through a sieve such that the concrete-reinforcing fibers are piled.

6. A structure of packaging a fiber shaped body, wherein the fiber shaped body according to claim 1 is packed in a flat box.

7. A method of mixing fiber-reinforced concrete, the method comprising feeding the fiber shaped body according to claim 1 into a mixing machine.

\* \* \* \* \*